UNITED STATES PATENT OFFICE.

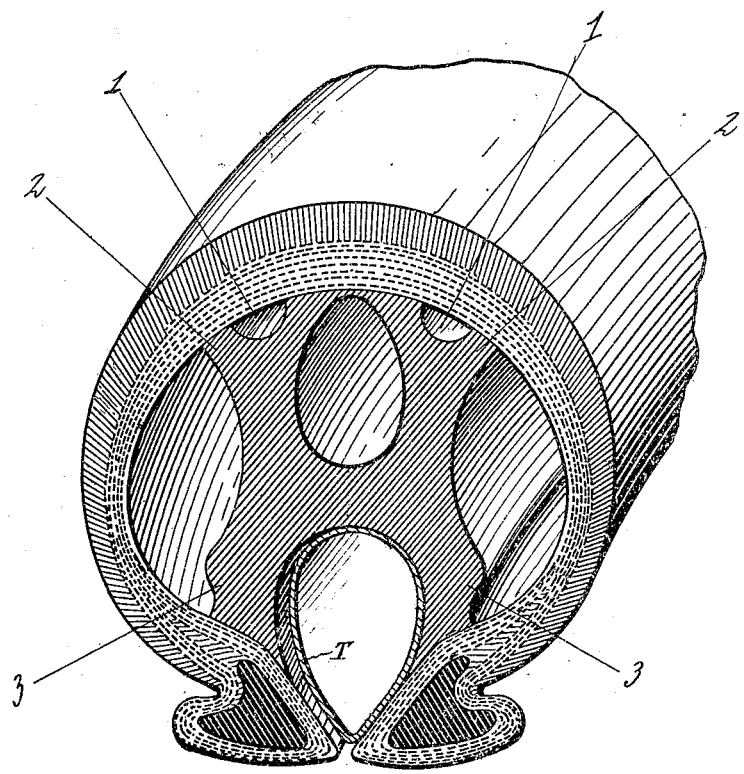

WILLIAM L. von EDELKRANTZ, OF MEXICO, MEXICO.

RESILIENT TIRE FOR AUTOMOBILES AND OTHER VEHICLES.

1,413,078.  Specification of Letters Patent.  Patented Apr. 18, 1922.

Application filed June 25, 1920. Serial No. 391,594.

*To all whom it may concern:*

Be it known that I, WILLIAM L. VON EDELKRANTZ, subject of the King of Denmark, residing at Mexico city, Federal District, Mexico, have invented certain new and useful Improvements in Resilient Tires for Automobiles or other Vehicles, of which the following is a specification.

This invention refers to a new and useful resilient tire for automobiles and other vehicles, which will be puncture-proof without inserting metal or other material in the tread of the tire.

This puncture-proof tire I obtain by means of a core made of a resilient material vulcanized or otherwise fixed to the inside of an ordinary tire.

An object of my invention is to provide a tire, in which all weak points of the ordinary pneumatic tire has been fully considered and overcome, and which will not collapse, but will stand up under the weight of the car, even if the inner tube is not inflated. Another object of my invention is to prevent the strain on the weak part of the tire, which are the sides, and the destruction of the rim caused by running with an ordinary tire not properly inflated.

This puncture-proof tire I obtain by means of a core made of a resilient material fitted to the inside of an ordinary tire, which core flexes under the weight of the vehicle and load and sustains the same mechanically. Means are also provided for increasing the flexibility of the core to control the rigidity thereof under varying conditions.

As will be seen from the accompanying drawing the core is divided in the part that corresponds to the side of the rim of the tire in such a way that a chamber is formed to receive an inner tube of small diameter. The core as viewed in cross section may have the form of an H which is closed at the top, where two peripheral grooves (1) are provided, with the object of allowing the core to bend freely and easily. At the outer side of each inner arm or leg of the H, there is also provided a groove (3) with the same purpose of allowing bending of the core.

This core gives to the tire more flexibility and resilience than will be found in any ordinary pneumatic tire with an inner tube of full size of the inside of the tire properly inflated.

The points of resilience are first between the two grooves (1), just below the tread of the tire, allowing the tread to bend slightly under the weight of the car or from shocks. These first points of flexibility will absorb all shocks from unevenness in the road.

The second points of flexibility will be at the two points marked with (2) in the drawing, where the core allows the tire to bend under a heavier load or greater shock.

The third point of flexibility will be at the grooves 3, which will allow the tire to bend under a very heavy load or very strong shock or obstruction in the road.

As the core has been constructed on the well known principle of triangles for resistance, it will with all its resilience sustain the proper weight of the car even if the inner tube T be not inflated.

As to the inner tube T, this will be absolutely puncture-proof, as it is protected by the core, and it will serve two purposes. First it will serve for seating the beads or edges of the tire in its proper place in the clinch of the rim, and next it will serve to make the tire more flexible by inflating it more whereby the two inner arms of the core will bend outwardly and give less resistance to the core.

With the core of my invention the tire will give from three to four times more service than any ordinary pneumatic tire.

The punctures, cuts or disinflating will not have any detrimental effect on the tire. The tire will be more resilient than the ordinary pneumatic tire inflated to its proper air pressure, and the tire will stand up under the proper weight of the car whether furnished with inner tube or not. As will be understood the inner tube is not necessary but recommendable.

Having thus described my invention what I claim is:

1. A tire for automobiles or other vehicles comprising a shoe; a core of resilient material fitted inside said shoe and having the shape of an H in cross section, closed at the outer part, leaving a chamber between the two inner arms for the insertion of an inner tube, and provided with two peripheral grooves in the outer part and two circumferential face grooves in the inner part for allowing partial bending of the core.

2. A resilient tire comprising a shoe; and a resilient core within said shoe having substantially the shape in cross section of an H, the outer legs thereof bearing against the road side of the shoe and the inner legs bearing agaist the rim side of the shoe and adapted to receive between them an inflatable pneumatic tube which upon being inflated renders the core more resilient.

3. A resilient tire comprising a shoe; a resilient core within said shoe, said core flexing under the weight of a vehicle and the load and sustaining the same mechanically; and means adapted to bear against the core and capable of having its pressure varied, said means rendering the core more yielding under the load when the pressure of said means is increased.

4. A resilient tire comprising a shoe; a resilient substantially H-shape in cross section core within said shoe, said core flexing under the weight of a vehicle and load and sustaining the same mechanically; and pneumatic means inserted in said core for variably increasing or decreasing the flexibility thereof to compensate for varying conditions.

5. A resilient tire comprising a shoe; a resilient core within said shoe, said core flexing under the weight of a vehicle and load and sustaining the same mechanically; and a pneumatic tube inserted in said core, so arranged as to render the core more yielding under a load when said pneumatic tube is inflated.

6. A core for pneumatic tires having a substantial H shape in cross section, the two outer legs of the H being united at their ends and each having a peripheral groove therein, the inner legs being spaced and each having a circumferential face groove therein, said core having three principal flexion points which function seriatim as the load or roughness of the road increases, the first flexion taking place between the two peripheral grooves, the second taking place at the extremity of each outer leg between the peripheral groove and the outside of the leg, and the third taking place adjacent the circumferential face grooves.

7. A resilient core for a tire shoe having substantially the shape in cross section of an H, the outer legs thereof bearing against the road side of the shoe and the inner legs bearing against the rim side of the shoe and adapted to receive between them an inflatable pneumatic tube which upon being inflated renders the core more resilient.

8. A resilient tire comprising a shoe; and a core of resilient material located within said shoe and being shaped to bend with freedom to absorb any shock or pressure received, said core having a chamber in the inner portion thereof for the reception of an inner tube, and having peripheral grooves on the outer portion, and circumferential base grooves on the inner portion for allowing partial bending of the core.

9. A resilient tire comprising a shoe; and a core of resilient material within said shoe and being shaped to bend with freedom to absorb any shock or pressure received, the outer part of said core bearing against the road side of the shoe and the inner part bearing against the rim side of the shoe said inner part being adapted to receive an inflatable pneumatic tube which renders the tire more resilient when the air pressure within said penumatic tube is increased.

10. A resilient tire comprising a shoe: a core of resilient material within said shoe having its outer portion bearing against the road side of the shoe and its inner portion bearing against the rim side of the shoe and thereby mechanically sustaining the weight of a vehicle and load and its intermediate portion entirely out of engagement with the shoe; and a pneumatic means inserted in said core and effective on said intermediate portion thereof for variably increasing or decreasing the flexibility of the core to compensate for varying conditions.

In testimony whereof I have affixed my signature.

WILLIAM L. von EDELKRANTZ.